(12) United States Patent
Vaughan et al.

(10) Patent No.: US 7,340,463 B1
(45) Date of Patent: Mar. 4, 2008

(54) CACHING PERMISSIONS INFORMATION

(75) Inventors: Greg B. Vaughan, Santa Cruz, CA (US); David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 379 days.

(21) Appl. No.: 10/877,048

(22) Filed: Jun. 25, 2004

(51) Int. Cl.
G06F 7/00 (2006.01)
G06F 17/30 (2006.01)

(52) U.S. Cl. .......................................... 707/9; 709/201
(58) Field of Classification Search ................. 709/223, 709/220, 201; 707/3, 2, 9
See application file for complete search history.

(56) References Cited

U.S. PATENT DOCUMENTS

| | | | |
|---|---|---|---|
| 5,173,939 A | 12/1992 | Abadi et al. | |
| 5,220,604 A | 6/1993 | Gasser et al. | |
| 5,283,830 A | 2/1994 | Hinsley et al. | |
| 5,315,657 A | 5/1994 | Abadi et al. | |
| 5,748,896 A | 5/1998 | Daly et al. | |
| 5,752,196 A | 5/1998 | Ahvenainen et al. | |
| 5,852,822 A | 12/1998 | Srinivasan et al. | |
| 5,897,637 A | 4/1999 | Guha | |
| 6,047,228 A | 4/2000 | Stone et al. | |
| 6,212,525 B1 | 4/2001 | Guha | |
| 6,263,434 B1 | 7/2001 | Hanna et al. | |
| 6,366,913 B1 | 4/2002 | Fitler, Jr. et al. | |
| 6,529,882 B1 | 3/2003 | Park et al. | |
| 6,671,695 B2 | 12/2003 | McFadden | |
| 6,697,835 B1 * | 2/2004 | Hanson et al. | 709/201 |
| 6,862,602 B2 | 3/2005 | Guha | |
| 6,883,100 B1 | 4/2005 | Elley et al. | |
| 6,947,924 B2 | 9/2005 | Bates et al. | |
| 6,965,767 B2 | 11/2005 | Maggenti et al. | |
| 6,975,873 B1 | 12/2005 | Banks et al. | |
| 7,024,515 B1 | 4/2006 | Ruan et al. | |
| 7,032,243 B2 | 4/2006 | Leerssen et al. | |
| 7,072,958 B2 * | 7/2006 | Parmar et al. | 709/223 |
| 7,080,195 B2 | 7/2006 | Ngai et al. | |
| 7,085,365 B2 | 8/2006 | Kauppinen | |
| 7,130,839 B2 | 10/2006 | Bireham et al. | |
| 7,177,978 B2 | 2/2007 | KanKar et al. | |
| 7,213,262 B1 | 5/2007 | Elley et al. | |
| 7,233,974 B2 | 6/2007 | Kawahara et al. | |
| 7,240,149 B1 | 7/2007 | Nagarej et al. | |
| 7,240,171 B2 | 7/2007 | Barton et al. | |
| 7,249,374 B1 | 7/2007 | Lear et al. | |
| 7,260,720 B2 | 8/2007 | Yamamoto et al. | |

(Continued)

*Primary Examiner*—Don Wong
*Assistant Examiner*—Hung Tran Vy
(74) *Attorney, Agent, or Firm*—Gazdzinski & Associates

(57) ABSTRACT

A method for determining group membership in a computer system, the method comprising: obtaining an identifier that describes a member of a group, the member of a group having a member hash table that contains group membership information describing to what groups a member belongs; performing a primary search of a plurality of groups to determine if each group contains the member's identifier, each group in the plurality having a group hash table that describes to what other groups the group belongs, caching the results of the primary search in the member hash table, for each group to which the member belongs, performing a secondary search of a plurality of groups to determine what groups contain the group to which the member belongs, and caching the results of the secondary search into the group hash table and merging the results into the member hash table, and reading the member hash table to determine group membership.

35 Claims, 2 Drawing Sheets

U.S. PATENT DOCUMENTS

| | | |
|---|---|---|
| 2002/0059191 A1* | 5/2002 | Tamura .................. 707/2 |
| 2002/0144149 A1 | 10/2002 | Hanna et al. |
| 2003/0041141 A1 | 2/2003 | Abdelaziz et al. |
| 2003/0196094 A1* | 10/2003 | Hillis et al. .................. 713/179 |
| 2004/0054899 A1 | 3/2004 | Balfanz et al. |
| 2005/0097166 A1 | 5/2005 | Patrick et al. |
| 2005/0220129 A1* | 10/2005 | Boyd .................. 370/428 |

* cited by examiner

CACHING PERMISSIONS INFORMATION

FIELD

The present invention relates broadly to access control lists in computer operating systems. Specifically, the present invention relates to caching membership information and retrieving the membership information to avoid maintaining a database of backpointers.

BACKGROUND

Controlling user access is a fundamental aspect of network operating system functionality. With the proliferation of computer networks serving large numbers of users, access control lists are a fundamental part of managing network traffic as well as security. Users and other entities can be members of a group. Members and groups are represented in computer systems as objects. Members are organized into groups, with each group having certain privileges and access capabilities. Groups can contain subgroups, which introduces increased complexity to the network operating system's access control list implementation.

In current systems where group membership is determined at login time, the system suffers from the serious defect of only finding a limited number of groups to which the member belongs. Simply enumerating all the groups to see which ones the user is a member of is a concept that clearly doesn't scale well, and if nested groups are allowed, enumerating all groups to which a member belongs becomes impossible. Some directory services provide group membership determination at login, but only through database maintenance of back pointers. Such a database must be constantly updated as groups are created, and members join or are removed from groups. This is computationally expensive and requires significant bandwidth across large systems. Lightweight directory access protocol (LDAP) servers are becoming more and more popular among system administrators, but are overwhelmed by the demands and costs of maintaining such a database. Thus, there is a heartfelt need for a mechanism that meets the requirement of computational economy while still managing large and complex access control lists.

SUMMARY

The present invention solves the problems described above by determining group membership in a computer system through obtaining an identifier that describes a member of a group. The member of a group has a member hash table that contains group membership information describing to what groups a member belongs. A primary search is performed on a plurality of groups to determine if each group contains the member's identifier. Each group in the plurality has a group hash table that describes to what other groups the group belongs. The results of the primary search are cached in the member hash table. For each group to which the member belongs, a secondary search is performed on a plurality of groups to determine what groups contain the group to which the member belongs. These results of the secondary search are cached into the group hash table and merging into the member hash table. In an embodiment, the secondary search is performed on all subgroups, with each match being cached into the group hash table and merged into the member hash table. By reading the member hash table, group membership is then determined.

In another aspect, a membership updater daemon is provided that keeps the member's indirect membership information current. The membership updater contains a local cache on a node, as well as membership objects for all members or groups referenced directly or indirectly by groups on the node. Each member or group object in the cache maintains only immediate back pointers in the form of lists of groups that contain this member or group.

DETAILED DESCRIPTION

The present invention introduces the concept of access control lists (ACLs) in both the file system and directory. These ACLs are used on the filesystem, for directory access and for service access. In each case, an ACL consists of a number of access control entries, each of which identify a set of rights and to whom that set of rights is granted or possibly denied.

The present invention utilizes a "who" function that determines if the asking entity somehow matches an entry on an ACL. The "who" function can identify users and groups of users, as well as computers. In an embodiment, each of these entities (user, group or computer) is identified by a 128-bit number. However, previously-implemented UNIX groups are not sufficient to specify whether a given user is a member of a group. The most significant problem is that the UNIX group mechanism only identifies users by name, and there is a need for a more exact way of specifying users.

The present invention provides a daemon referred to herein as the resolver. If the client is unable to get a complete list of groups out of the user records, the resolver can employ the "who" function is to answer the question, "is user x a member of group y" and cache the result. This requires resources that run in the kernel (such as file systems) to make a call to a user-level process. The resolver can make system calls to inspect the group and see if the user is a member. For nested groups, the resolver may need to make repeated calls to fetch subgroups. The resolver caches group results as well as user membership data.

Thus, the resolver is used to construct an inverse mapping of directory services group membership information, and convert information relating to membership from the form Y contains X, Z contains Y, etc. to the form X is a member of Y, Y is a member of Z, etc. This is done on an as-needed basis, and avoids the computational complexity of maintaining a centralized database of backpointers. In an embodiment, rather than expanding groups, an indexed search of the server can be performed to find groups that contain the user directly. A recursive search is performed for groups containing those groups to build up a membership list for the specific user.

Figure 1:
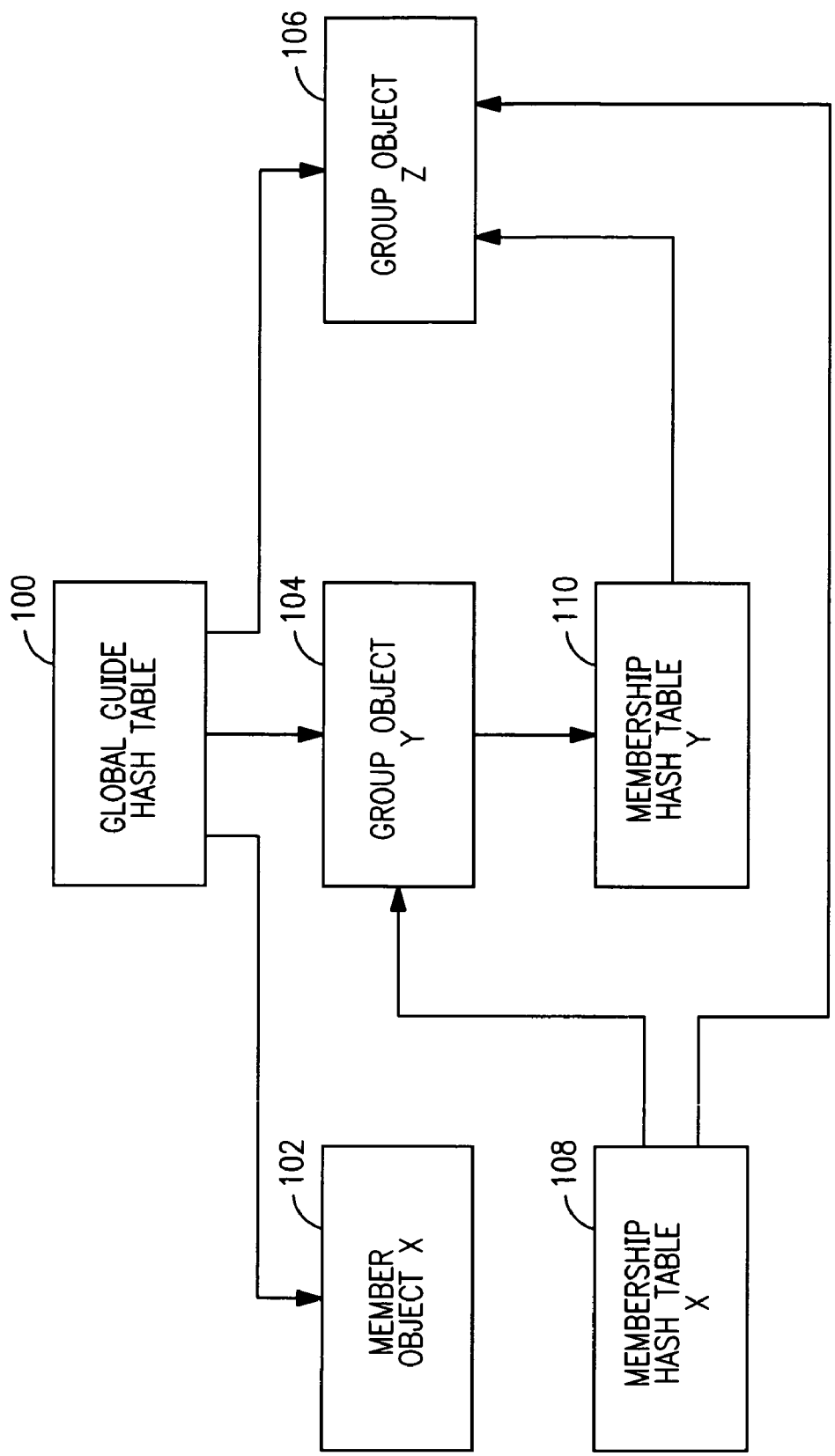
FIG. 1 illustrates the relationship of members and groups and their respective hash tables in accordance with the present invention.

Directing attention to FIG. 1, hash table 100 is a table of globally unique identifiers for a given system, with points to both members and groups. As illustrated, hash table 100 maintains pointers to member object X 102, group object Y 104, and group object Z 106. Member object X 102 maintains membership hash table 108, which maintains pointers to group Y object 104 and group Z object 106, signifying that membership object 102 is a member of both group Y and group Z. Group object Y 104 maintains group hash table 110, which contains a pointer to group Z 108, which indicates that group Y is a member group of group Z.

Figure 2:
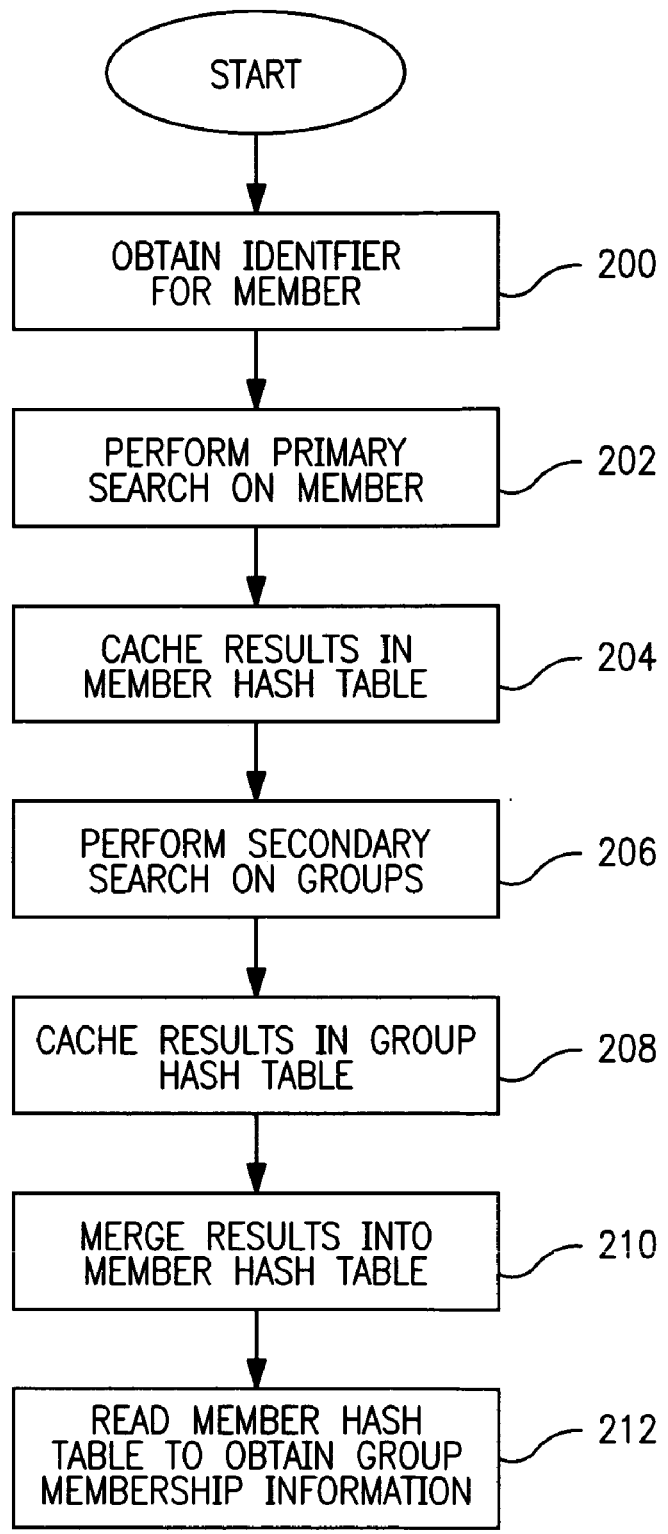
FIG. 2 illustrates in flow diagram form the sequence of acts performed in accordance with the present invention.
Figure 2:
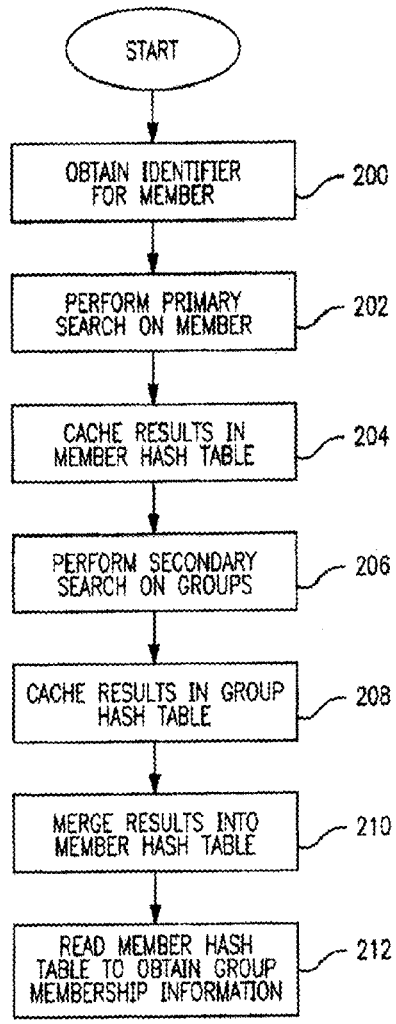

The sequence of acts performed in accordance with the present invention is illustrated in FIG. 2. For example, assume member object X 102 is a member of group object Y 104, which in turn is a member (a subset) of group object Z 106. To determine whether member object X 102 is a member of group Z, a search is performed on member object X 102 to retrieve the global ID that describes member object X 102 (act 200). A search is performed to find all groups that contain member object X 102's global ID, which returns group Y (act 202). This search result is cached (act 204). Another search is performed to find all groups that contain group object Y 104's group ID (act 206), which returns group Z. This information is cached for group object Y 104 (act 208) and this membership information is merged into member object X 102's hash table 108 (act 210). Group membership can be determined by looking directly at hash table 108 (act 212). In an embodiment, the time to live (expiration period) of member X hash table 108 is set to the smallest value of the caches that have been merged into member X hash table 108. In this case the time to live expires whenever hash table 110 expires.

To preserve computational economy on the server, a membership updater daemon can be employed by the server to keep the user's indirect membership information current. The membership updater contains a local cache of all groups on a node, as well as membership objects for all users or groups referenced directly or indirectly by groups on the node. Each member or group object in the hash tables 108, 110 maintain only immediate back pointers in the form of lists of groups which contain this user or group.

When group information changes, the membership updater only needs to update the immediate back pointers. However, when subgroups are added or removed, it needs to expand those groups so it can build a complete list of users whose membership attributes need to be updated. In an embodiment, if a search returns a group multiple times during an expansion, the group can be skipped since all its members are already on the list. Then the membership updater processes all the users that need to be updated, and expands their immediate memberships in the reverse direction to contain all the groups they're indirectly a member of.

In embodiments where changes in groups on a remote server can change membership in a local group that contains that remote group, the membership updater runs periodically even if it's also triggered by local change notifications.

While techniques for caching permissions information has been described and illustrated in detail, it is to be understood that many changes and modifications can be made to embodiments of the present invention without departing from the spirit thereof.

What is claimed is:

1. A method for determining group membership in a computer system, the method comprising:
    obtaining an identifier that describes a member of a group, the member of a group having a member hash table that contains group membership information describing to what groups a member belongs;
    performing a primary search of a first plurality of groups to determine if each group contains the identifier, each group in the first plurality having a group hash table that describes to what other groups the group belongs;
    caching the results of the primary search in the member hash table;
    for each group to which the member belongs:
    performing a secondary search of a second plurality of groups to determine what groups contain the group to which the member belongs; and
    caching the results of the secondary search into the group hash table and merging the results into the member hash table; and
    reading the member hash table to determine group membership.

2. The method of claim 1, wherein the secondary search is performed recursively on all subgroups within the second plurality of groups and the results are cached in the group hash table and merged into the member hash table.

3. The method of claim 1, wherein the member hash table expires when the group hash table expires.

4. The method of claim 1, wherein said method is adapted for use in a computer system comprising an access control list, wherein the access control list comprises a set of access rights for each group in the first plurality of groups.

5. The method of claim 4, wherein each set of access rights comprises rules for directory and service access.

6. The method of claim 4, wherein said identifier uniquely corresponds to a user of the computer system.

7. The method of claim 1, further comprising constructing an inverse mapping of group information stored within the member hash table.

8. The method of claim 1, wherein said performing a secondary search of a second plurality of groups to determine what groups contain the group to which the member belongs comprises utilizing a recursive procedure.

9. The method of claim 1, further comprising updating the member hash table when group information changes.

10. A computer-readable medium containing instructions which, when executed by a computer, determine group membership in a computer system, by:
    obtaining an identifier that describes a member of a group, the member of a group having a member hash table that contains group membership information describing to what groups a member belongs;
    performing a primary search of a first plurality of groups to determine if each group contains the identifier, each group in the first plurality having a group hash table that describes to what other groups the group belongs;
    caching the results of the primary search in the member hash table;
    for each group to which the member belongs:
    performing a secondary search of a second plurality of groups to determine what groups contain the group to which the member belongs; and
    caching the results of the secondary search into the group hash table and merging the results into the member hash table; and
    reading the member hash table to determine group membership.

11. The computer-readable medium of claim 10, wherein said computer-readable medium is adapted for use in a computer system comprising an access control list, wherein the access control list comprises a set of access rights for each group in the first plurality of groups.

12. The computer-readable medium of claim 11, wherein each set of access rights comprises rules for directory and service access.

13. The computer-readable medium of claim 11, wherein said identifier uniquely corresponds to a user of the computer system.

14. The computer-readable medium of claim 10, further comprising instructions which, when executed by a computer, construct an inverse mapping of group information stored within the member hash table.

15. The computer-readable medium of claim 10, wherein said performing a secondary search of a second plurality of groups to determine what groups contain the group to which the member belongs comprises utilizing a recursive procedure.

16. The computer-readable medium of claim 10, further comprising instructions which, when executed by a computer, update the member hash table when group information changes.

17. A device comprising:
means for obtaining an identifier that describes a member of a group, the member of a group having a member hash table that contains group membership information describing to what groups a member belongs;
means for performing a primary search of a first plurality of groups to determine if each group contains the identifier, each group in the first plurality having a group hash table that describes to what other groups the group belongs;
means for caching the results of the primary search in the member hash table;
for each group to which the member belongs:
means for performing a secondary search of a second plurality of groups to determine what groups contain the group to which the member belongs; and
means for caching the results of the secondary search into the group hash table and merging the results into the member hash table; and
means for reading the member hash table to determine group membership.

18. The device of claim 17, further comprising means for updating the member hash table when group information changes.

19. The device of claim 17, further comprising means for building a list of users with membership attributes which need to be updated.

20. The device of claim 17, further comprising means for constructing an inverse mapping of group information stored within the member hash table.

21. A method for determining group membership in a computerized device, the method comprising:
providing an identifier of a member of a group, the member having first information describing to what groups said member belongs associated therewith;
performing a search of a first plurality of groups to determine which of said groups contain the identifier, each group in the first plurality having second information that describes to what other groups that group belongs;
storing the results of the search with said first information;
for each group to which the member belongs:
performing a search of a second plurality of groups to determine what groups include the group to which the member belongs; and
storing the results of said search of a second plurality with said second information, and merging both said results and second information into the first information to produce merged information; and
accessing the merged information to determine group membership.

22. The method of claim 21, wherein said method is adapted for use in a computerized device comprising an access control list, wherein the access control list comprises a set of access rights for each group in the first plurality of groups.

23. The method of claim 22, wherein each set of access rights comprises rules for directory and service access.

24. The method of claim 21, wherein said identifier uniquely corresponds to a user of the computerized device.

25. The method of claim 21, further comprising constructing an inverse mapping of group information stored with the first information.

26. The method of claim 21, wherein said performing a search of a second plurality of groups comprises utilizing a recursive procedure.

27. The method of claim 21, further comprising updating the first information when group information changes.

28. A computer-readable medium containing instructions which, when executed by a computer, determine group membership in a computer system, by:
obtaining an identifier of a member of a group, the member having first information describing to what groups said member belongs associated therewith;
performing a search of a first plurality of groups to determine which of said groups contain the identifier, each group in the first plurality having second information that describes to what other groups that group belongs;
storing the results of the search with said first information;
for each group to which the member belongs:
performing a search of a second plurality of groups to determine what groups include the group to which the member belongs; and
storing the results of said search of a second plurality with said second information, and merging both said results and second information into the first information to produce merged information; and
accessing the merged information to determine group membership.

29. A method for determining group membership in a computer system, comprising:
providing an identifier of a member of a group, at least one of the member or identifier having first information describing to what groups said member belongs associated therewith;
performing a search of a first plurality of groups to determine which of said groups contain the identifier, each group in the first plurality having second information that describes to what other groups that group belongs;
storing the results of the search with said first information;
for each group to which the member belongs:
performing a search of a second plurality of groups to determine what groups include the group to which the member belongs; and
combining (i) the results of said search of a second plurality, (ii) said second information, and (iii) said first information, so as to produce merged information; and
accessing the merged information to determine group membership.

30. The method of claim 29, wherein said method is adapted for use in a computer system comprising an access control list, wherein the access control list comprises a set of access rights for each group in the first plurality of groups.

31. The method of claim 30, wherein each set of access rights comprises rules for directory and service access.

32. The method of claim 29, wherein said identifier uniquely corresponds to a user of the computer system.

33. The method of claim 29, further comprising constructing an inverse mapping of group information stored with the first information.

34. The method of claim 29, wherein said performing a search of a second plurality of groups comprises utilizing a recursive procedure.

35. The method of claim 29, further comprising updating the first information when group information changes.

* * * * *

UNITED STATES PATENT AND TRADEMARK OFFICE
CERTIFICATE OF CORRECTION

PATENT NO. : 7,340,463 B1
APPLICATION NO. : 10/877048
DATED : March 4, 2008
INVENTOR(S) : Greg B. Vaughan et al.

It is certified that error appears in the above-identified patent and that said Letters Patent is hereby corrected as shown below:

The title page should be deleted to appear as per attached title page.

The sheet of drawing consisting of figure 2 should be deleted to appear as per attached sheet.

Signed and Sealed this

Ninth Day of September, 2008

JON W. DUDAS
*Director of the United States Patent and Trademark Office*

(12) United States Patent
Vaughan et al.

(10) Patent No.: US 7,340,463 B1
(45) Date of Patent: Mar. 4, 2008

(54) CACHING PERMISSIONS INFORMATION

(75) Inventors: Greg B. Vaughan, Santa Cruz, CA (US); David M. O'Rourke, San Jose, CA (US)

(73) Assignee: Apple Inc., Cupertino, CA (US)

(*) Notice: Subject to any disclaimer, the term of this patent is extended or adjusted under 35 U.S.C. 154(b) by 379 days.

(21) Appl. No.: 10/877,048

(22) Filed: Jun. 25, 2004

(51) Int. Cl.
G06F 7/00 (2006.01)
G06F 17/30 (2006.01)

(52) U.S. Cl. .................. 707/9; 709/201
(58) Field of Classification Search .......... 709/223, 709/220, 201; 707/3, 2, 9
See application file for complete search history.

(56) References Cited

U.S. PATENT DOCUMENTS

| | | | |
|---|---|---|---|
| 5,173,939 A | 12/1992 | Abadi et al. | |
| 5,226,604 A | 6/1993 | Gasser et al. | |
| 5,283,830 A | 2/1994 | Hinsley et al. | |
| 5,315,657 A | 5/1994 | Abadi et al. | |
| 5,748,896 A | 5/1998 | Daly et al. | |
| 5,752,196 A | 5/1998 | Ahvenainen et al. | |
| 5,852,822 A | 12/1998 | Srinivasan et al. | |
| 5,897,637 A | 4/1999 | Guha | |
| 6,047,228 A | 4/2000 | Stone et al. | |
| 6,212,525 B1 | 4/2001 | Guha | |
| 6,263,434 B1 | 7/2001 | Hanna et al. | |
| 6,366,913 B1 | 4/2002 | Fitler, Jr. et al. | |
| 6,529,882 B1 | 3/2003 | Park et al. | |
| 6,671,695 B2 | 12/2003 | McFadden | |
| 6,697,835 B1* | 2/2004 | Hanson et al. | 709/201 |
| 6,862,602 B2 | 3/2005 | Guha | |
| 6,883,100 B1 | 4/2005 | Elley et al. | |
| 6,947,924 B2 | 9/2005 | Bates et al. | |
| 6,965,767 B2 | 11/2005 | Maggenti et al. | |
| 6,975,873 B1 | 12/2005 | Banks et al. | |
| 7,024,515 B1 | 4/2006 | Ruan et al. | |
| 7,032,243 B2 | 4/2006 | Leerssen et al. | |
| 7,072,958 B2* | 7/2006 | Parmar et al. | 709/223 |
| 7,080,195 B2 | 7/2006 | Ngai et al. | |
| 7,085,365 B2 | 8/2006 | Kauppinen | |
| 7,130,839 B2 | 10/2006 | Bingham et al. | |
| 7,177,978 B2 | 2/2007 | KanKar et al. | |
| 7,213,263 B1 | 5/2007 | Elley et al. | |
| 7,233,974 B2 | 6/2007 | Kawahara et al. | |
| 7,240,149 B1 | 7/2007 | Nagarej et al. | |
| 7,240,171 B2 | 7/2007 | Barton et al. | |
| 7,249,374 B1 | 7/2007 | Lear et al. | |
| 7,260,720 B2 | 8/2007 | Yamamoto et al. | |

(Continued)

Primary Examiner—Don Wong
Assistant Examiner—Hung Tran Vy
(74) Attorney, Agent, or Firm—Ciazdzinski & Associates

(57) ABSTRACT

A method for determining group membership in a computer system, the method comprising: obtaining an identifier that describes a member of a group, the member of a group having a member hash table that contains group membership information describing to what groups a member belongs; performing a primary search of a plurality of groups to determine if each group contains the member's identifier, each group in the plurality having a group hash table that describes to what other groups the group belongs, caching the results of the primary search in the member hash table, for each group to which the member belongs, performing a secondary search of a plurality of groups to determine what groups contain the group to which the member belongs, and caching the results of the secondary search into the group hash table and merging the results into the member hash table, and reading the member hash table to determine group membership.

35 Claims, 2 Drawing Sheets

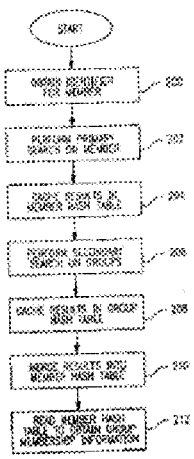

FIG. 2